US012794180B2

(12) United States Patent
Lai

(10) Patent No.: US 12,794,180 B2
(45) Date of Patent: Nov. 10, 2026

(54) PLUG CONNECTOR BUCKLE RELEASE MECHANISM AND THE MATCHING SOCKET CONNECTOR

(71) Applicant: ACES ELECTRONICS CO., LTD., Taoyuan City (TW)

(72) Inventor: Yi-Guang Lai, Taoyuan City (TW)

(73) Assignee: ACES ELECTRONICS CO., LTD., Taoyuan City (TW)

( * ) Notice: Subject to any disclaimer, the term of this patent is extended or adjusted under 35 U.S.C. 154(b) by 328 days.

(21) Appl. No.: 18/676,992

(22) Filed: May 29, 2024

(65) Prior Publication Data

US 2025/0047039 A1 Feb. 6, 2025

(30) Foreign Application Priority Data

Aug. 2, 2023 (TW) ................................ 112208179

(51) Int. Cl.
*H01R 13/633* (2006.01)
*H01R 12/79* (2011.01)

(52) U.S. Cl.
CPC ......... *H01R 13/6335* (2013.01); *H01R 12/79* (2013.01)

(58) Field of Classification Search
CPC ............................ H01R 13/6335; H01R 12/79
See application file for complete search history.

(56) References Cited

U.S. PATENT DOCUMENTS

2024/0429666 A1* 12/2024 Wu ........................ H01R 12/73

* cited by examiner

*Primary Examiner* — Neil Abrams
(74) *Attorney, Agent, or Firm* — MUNCY, GEISSLER, OLDS & LOWE, P.C.

(57) ABSTRACT

A plug connector and a matching socket connector are disclosed. When the plug connector is inserted into the socket connector to form an electrical connection, the two resisting elastic pieces of the plug connector buckle release mechanism press upward against the inner side of the casing of the plug connector, and the hook portions of the two arms of the plug connector buckle release mechanism are forced to snap into the hook holes of the socket connector to form positioning. When unlocking, pull the pull strap of the plug connector buckle release mechanism to elastically deform two elastic portions, and the resisting elastic pieces elastically are deformed to link the hook portions to move downward and escape from the hook holes. This achieves the effect of the plug connector forming a stable connection with the socket connector and ensuring reliable movement.

10 Claims, 5 Drawing Sheets

PLUG CONNECTOR BUCKLE RELEASE MECHANISM AND THE MATCHING SOCKET CONNECTOR

This application claims the priority benefit of Taiwan patent application number 112208179, filed on Aug. 2, 2023.

BACKGROUND OF THE INVENTION

1. Field of the Invention

The invention relates to a plug connector buckle release mechanism, and in particular to a plug connector provided with a sliding seat and a buckle device for releasing on a corresponding socket connector through a pull strap to form a stable docking and easy separation operation.

2. Description of the Related Art

Nowadays, computer technology is developing at a rapid pace, and the development trend of computers is also moving towards strong computing power, fast speed and small size, and the number of computer communication ports is also reduced. This kind of communication ports can also be used with other devices with the same specifications, such as car audio, car computers, charging devices, satellite navigation, communication devices, etc. However, these devices contain communication port plugs, so the future development of such plugs with communication ports is also on the rise. However, with the improvement of technology in recent years, the size of plugs has become smaller and smaller. In terms of overall structural configuration, how to use good structural design to prevent the plug from directly pulling on the internal cable when plugging and unplugging, and to avoid the plug and socket connector from being too small and easily damaged. In addition, without any support or fixed structure for the plug, it is easy for the plug to be pulled and fall off after being inserted into the socket, thus affecting the signal transmission. Therefore, from the above detailed description, it can be found that when designing the plug, the main consideration can be to ensure the stability of the plug when docking with the socket connector. During use, it should be avoided to pull on the wire to cause the plug to detach. Therefore, in view of the shortcomings of the above-mentioned conventional designs, it is necessary for relevant industries to conduct additional research and development to improve the shortcomings of the conventional designs.

Therefore, in view of the above-mentioned problems and deficiencies, the inventor collected relevant information, evaluated and considered many aspects, and used his many years of experience in this industry to design this kind of plug connector buckle release mechanism and the matching socket connector.

SUMMARY OF THE INVENTION

It is therefore the main object of the present invention to provide a plug connector buckle release mechanism, comprising a connector, a sliding seat and a buckle device. The connector comprises a base block, a mating terminal set mounted in the base block, and a casing mounted outside the base block. The base block comprises a docking portion formed on the front side thereof and a first mounting surface and a second mounting surface formed on the upper surface thereof in sequence from the docking portion toward the rear side thereof. The casing has two through holes bilaterally located on the top surface thereof corresponding to the docking portion. The sliding seat comprises a seat body slidably mounted on the second mounting surface, a pull strap fastened to the seat body, two hook-shaped connecting portions respectively provided at two opposite lateral sides of the seat body and extending in the same direction toward the docking portion, and at least one elastic portion formed on the rear side of the seat body. The buckle device is pivotally connected to base block. The buckle device comprises a base portion placed on the first mounting surface and located on the front side of the seat body of the sliding seat, and two arms respectively provided at the two sides of the base portion and extending in the same direction toward the docking portion. Each arm comprises a hook portion protruding upward from the suspended front end thereof at a front side relative to the base portion, a hook-shaped linkage portion protruding downward from the suspended opposing rear end thereof at a rear side relative to the base portion and coupled to one respective hook-shaped connecting portion of the sliding seat, and a resisting elastic piece provided at the suspended rear end above the hook-shaped linkage portion and stopped against an inner surface of the casing. When pulling the pull strap, the sliding seat is pulled by the pull strap to elastically deform the at least one elastic portion, and also elastically deform the resisting elastic pieces of the two arms to link the hook portions of the two arms to elastically deflect downward at the through holes of the casing.

It is another object of the present invention to provide a plug connector buckle release mechanism and the matching socket connector. The plug connector buckle release mechanism, comprises a connector, a sliding seat and a buckle device. The connector comprises a base block, a mating terminal set mounted in the base block, and a casing mounted outside the base block. The base block comprises a docking portion formed on the front side thereof and a first mounting surface and a second mounting surface formed on the upper surface thereof in sequence from the docking portion toward the rear side thereof. The casing has two through holes bilaterally located on the top surface thereof corresponding to the docking portion. The sliding seat comprises a seat body slidably mounted on the second mounting surface, a pull strap fastened to the seat body, two hook-shaped connecting portions respectively provided at two opposite lateral sides of the seat body and extending in the same direction toward the docking portion, and at least one elastic portion formed on the rear side of the seat body. The buckle device is pivotally connected to base block. The buckle device comprises a base portion placed on the first mounting surface and located on the front side of the seat body of the sliding seat, and two arms respectively provided at the two sides of the base portion and extending in the same direction toward the docking portion. Each arm comprises a hook portion protruding upward from the suspended front end thereof at a front side relative to the base portion, a hook-shaped linkage portion protruding downward from the suspended opposing rear end thereof at a rear side relative to the base portion and coupled to one respective hook-shaped connecting portion of the sliding seat, and a resisting elastic piece provided at the suspended rear end above the hook-shaped linkage portion and stopped against an inner surface of the casing. When the docking portion of the connector of the present invention is inserted into the socket portion of the matching socket connector to form an electrical connection, the two resisting elastic pieces press upward against the inner side of the casing, and the hook portions of the two arms are in an upward elastic pre-tensioned state and snap into the hook holes on the top surfaces of the socket portion of the matching socket connector to form positioning. When pulling the pull strap, the sliding seat is pulled by the pull strap to elastically deform the at least one elastic portion, and also elastically deform the resisting elastic pieces of the two arms to link the hook portions of the two arms to elastically deflect downward by a distance at the through holes of the casing. At this time, the two hook portions are separated from the hook holes of the socket portion of the socket connector and descend into the through holes of the casing.

DETAILED DESCRIPTION OF THE PREFERRED EMBODIMENT

Figure 1:
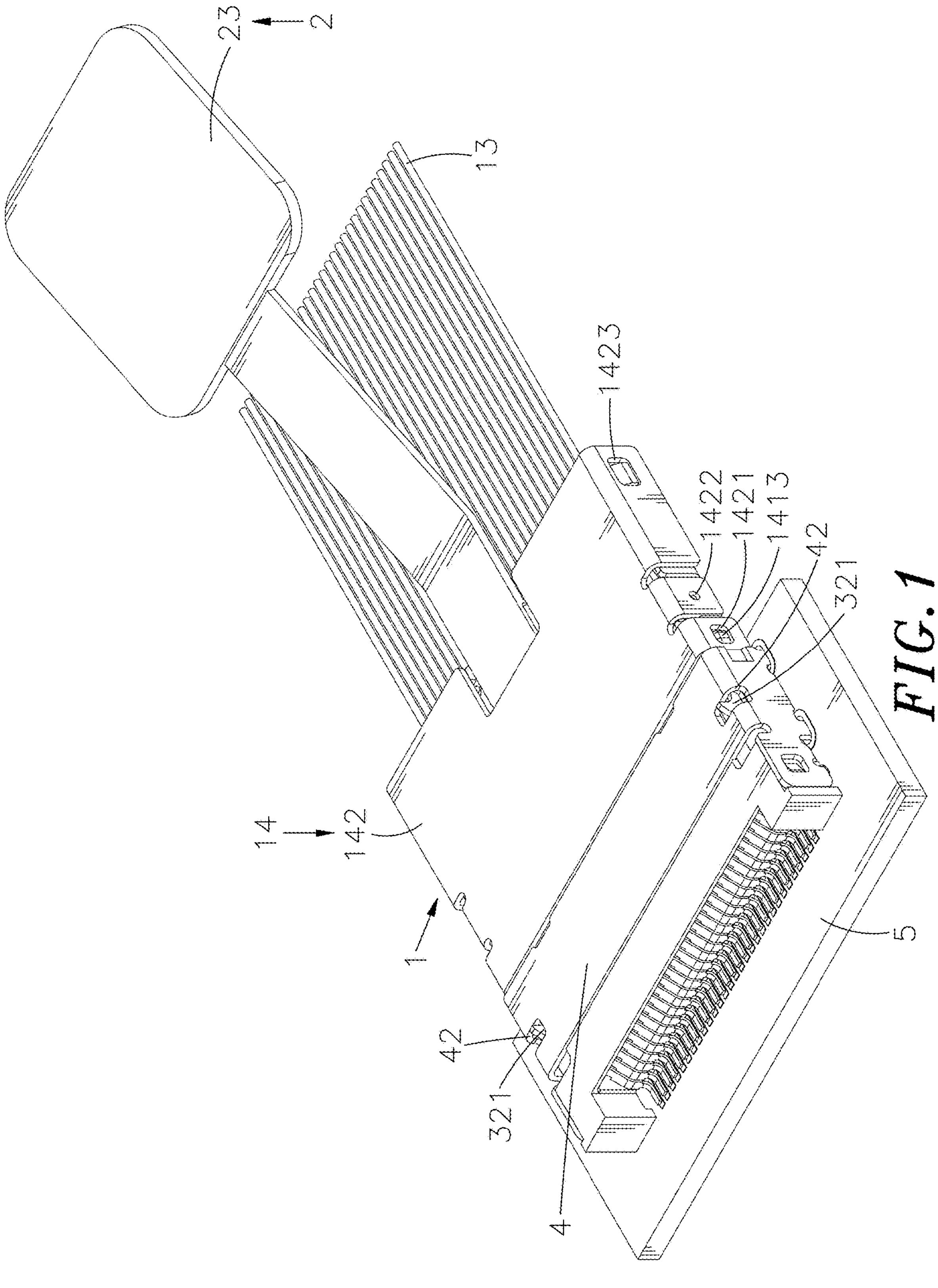
FIG. 1 is a three-dimensional appearance view of the present invention.

In order to achieve the above objects and effects, the technical means and structures adopted by the present invention are described in detail below with respect to the preferred embodiment of the present invention in companying with the drawings, so as to facilitate a complete understanding.

Please refer to FIGS. 1-4, which are three-dimensional appearance view of the present invention, three-dimensional appearance view of the connector of the present invention before docking, exploded view of the present invention and another perspective exploded view of the present invention. The plug connector buckle release mechanism of the present invention mainly comprises a connector 1, a sliding seat 2 and a buckle device 3.

The connector 1 comprises a base block 11, and a mating terminal set 12 equipped with a circuit board and welded with wires 13 and mounted in the base block 11. The base block 11 comprises a docking portion 111 formed on the front side thereof, a first mounting surface 112, a second mounting surface 113 and a stopper 1131 provided on the upper surface thereof in sequence from the docking portion 111 toward the rear side thereof, and two positioning structures 114 respectively formed on the two opposite lateral sides of the first mounting surface 112 and the second mounting surface 113, and at least one engaging portion 115 protruding from the bottom surface thereof. Each positioning structure 114 comprises a pivot portion 1141 and a limiting portion 1142 protruding outward and provided in sequence from the docking portion 111 toward the rear side. In addition, a casing 14 is located outside the base block 11, and the casing 14 comprises a bottom shell 141 set on the base block 11, and a cover shell 142 covering the first mounting surface 112 and the second mounting surface 113. The bottom shell 141 comprises a locating space 1410 in the center for accommodating and positioning the base block 11, two relatively concave limiting grooves 1411 respectively formed on both sides of the locating space 1410, a through hole 1412 located on the top surface of each of the limiting grooves 1411, a convex portion 1413 located on each of the two opposite lateral sides thereof, and at least one engaging hole 1414 located on the bottom surface thereof corresponding to the at least one engaging portion 115 of the base block 11. The cover shell 142 comprises a through hole 1421, a limiting pivot 1422 and a limiting hole 1423 provided on each of two side panels thereof in order from the front side to the rear side.

The sliding seat 2 comprises a seat body 21 mounted on the second mounting surface 113 in a position-limiting sliding manner, an opening 22 provided on the seat body 21, a pull strap 23 combined with the opening 22, two hook-shaped connecting portions 24 in the shape of an upward hook respectively perpendicular located on both sides of the seat body 21 and extending in the same direction toward the docking portion 111, and two elastic portions 25 that are elastomers extending obliquely and bilaterally and integrally formed on the rear side of the seat body 21.

The buckle device 3 is pivotally positioned on the positioning structures 114, and comprises a base portion 31 placed on the first mounting surface 112 and located on the front side of the seat body 21 of the sliding seat 2, two arms 32 respectively provided at the two sides of the base portion 31 and extending in the same direction toward the docking portion 111, and two rotating portions 33 respectively located on the two arms 32 adjacent to the base portion 31 and respectively pivotally coupled to the pivot portions 1141. Each arm 32 comprises a hook portion 321 protruding upward from the suspended front end thereof at a front side relative to the base portion 31, a hook-shaped linkage portion 322 in the shape of a downward hook protruding downward from the suspended rear end thereof at a rear side relative to the base portion 31 and coupled to one respective hook-shaped connecting portion 24 of the sliding seat 2, and a resisting elastic piece 323 provided at the suspended rear end above the hook-shaped linkage portion 322 to elastically pre-force the arm 32 upward.

Furthermore, when constructing the present invention, the pull strap 23 is first wound and fixed at the opening 22 of the sliding seat 2, and then the seat body 21 of the sliding seat 2 is placed on the second mounting surface 113 of the base block 11 to press the suspended ends of the integrally formed elastic portions 25 on both sides of the seat body 21 against the stopper 1131 of the second mounting surface 113. Then, place the base portion 31 of the buckle device 3 on the first mounting surface 112 and in front of the seat body 21 of the sliding seat 2 to pivotally couple the rotating portions 33 to the pivot portions 1141 of the positioning structures 114 so that the two arms 32 are respectively installed on both sides of the base block 11, and the hook-shaped linkage portions 322 of the two arms 32 are respectively assembled on the two hook-shaped connecting portions 24 of the sliding seat 2 to form a mutually hooked state. Then attach the locating space 1410 of the bottom shell 141 of the casing 14 onto the docking portion 111 to position the docking portion 111 in the relatively concave limiting grooves 1411. At this time, the two hook portions 321 are located in the positioning structures 114 and pass through the through holes 1412 on the top surface of the bottom shell 141, and the at least one engaging hole 1414 of the bottom shell 141 is engaged with the at least one engaging portion 115 of the base block 11 to form positioning. Then, cover and position the cover shell 142 of casing 14 on the first mounting surface 112 and the second mounting surface 113 to engage the limiting hole 1423 with the limiting portion 1142, and also to engage the through hole 1421 with the convex portion 1413 to form a stable positioning of the cover shell 142, so that the limiting pivots 1422 are inserted into the rotating portions 33 and coupled to the pivot portions 1141 such that the rotating portions 33 of the two arms 32 are pivotally positioned between the pivot portions 1141 of the positioning structures 114 and the limiting pivots 1422 of the cover shell 142. At this time, the resisting elastic pieces 323 of the buckle device 3 are upwardly supported against the inner wall surface of the cover shell 142 to force the hook portions 321 to maintain an upward elastic pre-forced state, thus completing the overall structure of the plug connector of the present invention.

Figure 2:
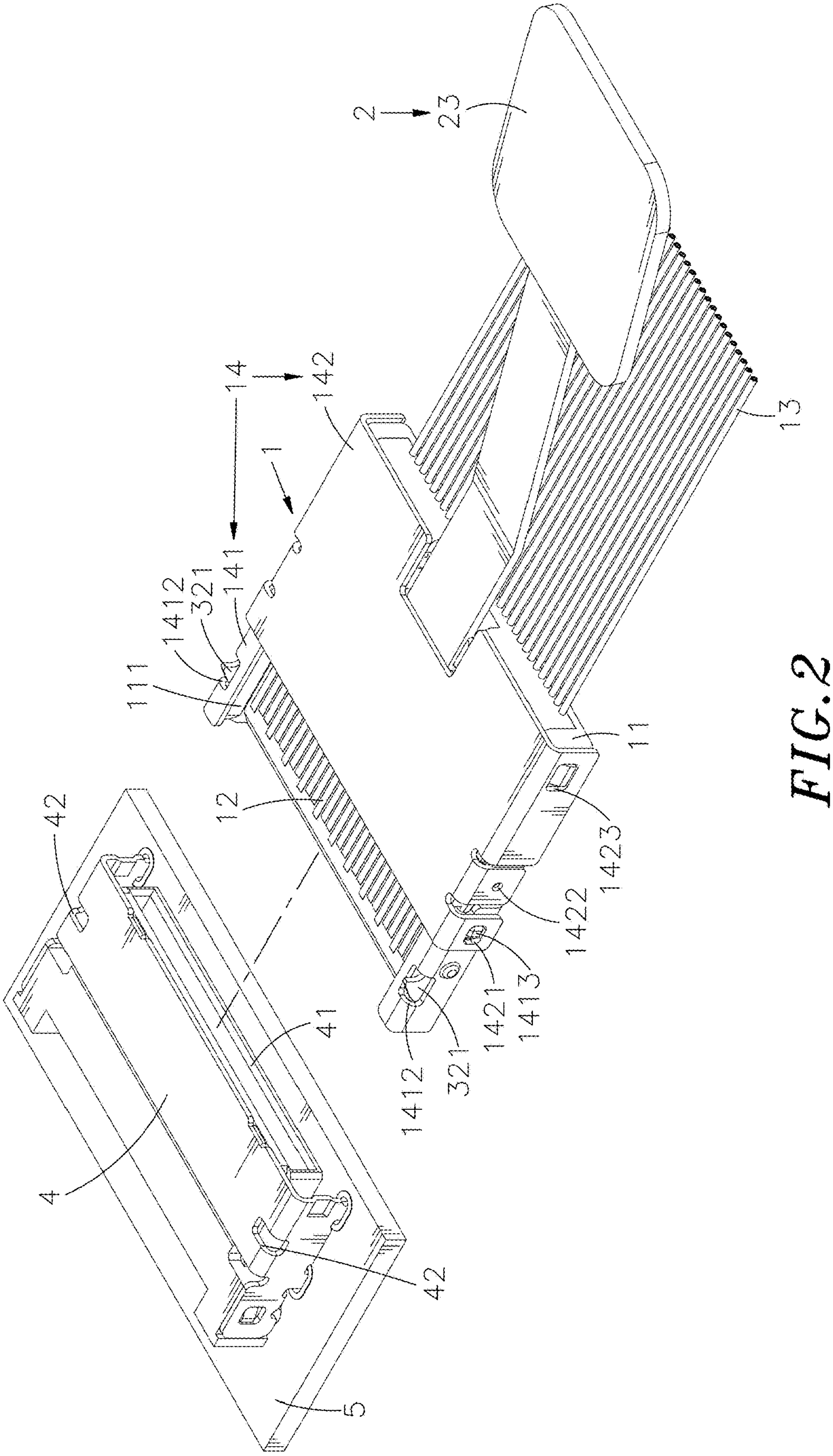
FIG. 2 is a three-dimensional appearance view of the connector of the present invention before docking.

Please continue to refer to FIGS. 1 to 2, which are three-dimensional appearance view of the present invention and three-dimensional appearance view of the connector of the present invention before docking. It can be clearly seen from the drawings that the socket connector 4 is soldered to a circuit board 5, the socket portion 41 of the socket connector 4 has two hook holes 42 bilaterally located on the top surface for positioning the hooking of the hook portions 321 of the two arms 32.

Figure 5:
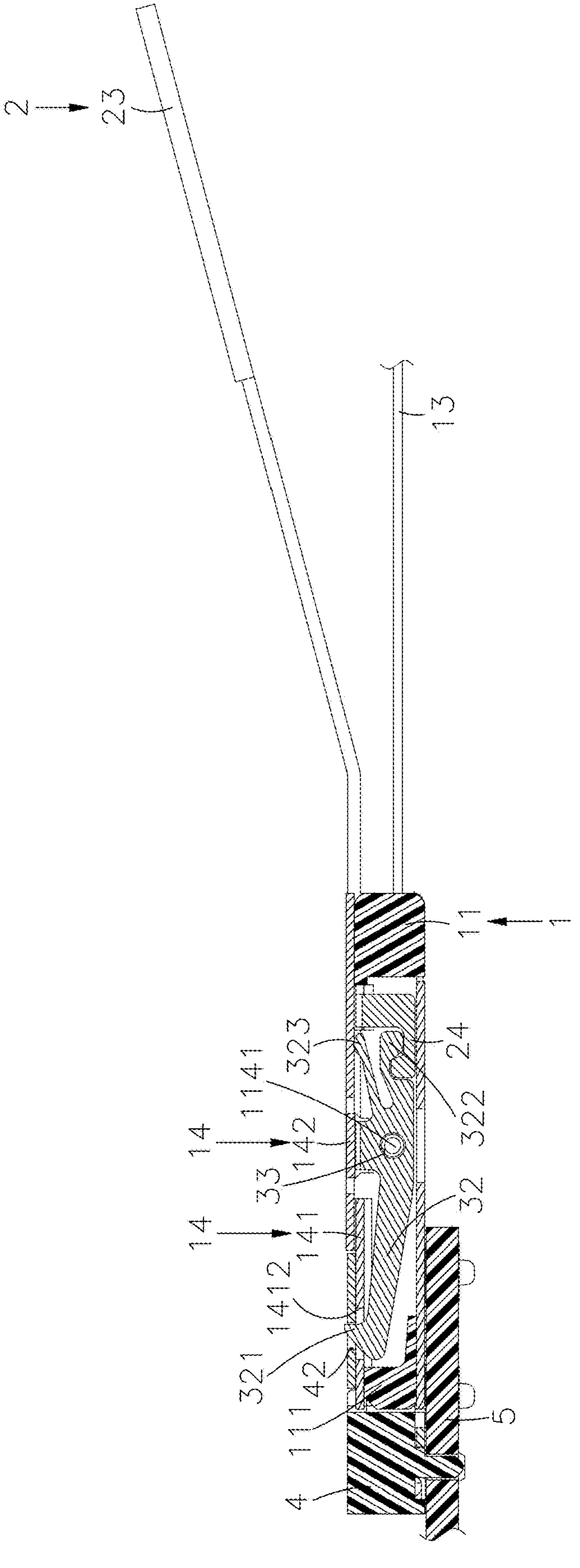
FIG. 5 is a side cross-sectional view of the present invention, showing the hook portion of the buckle device hooked in the respective hook hole of the socket portion of the socket connector.

Please continue to refer to FIGS. 2 and 5, which are three-dimensional appearance view of the connector of the present invention before docking and side cross-sectional view of the present invention, showing the hook portion of the buckle device hooked in the respective hook hole of the socket portion of the socket connector. It can be clearly seen from the drawings that when locking in the present invention, the docking portion 111 of the connector 1 of the present invention is first inserted into the socket portion 41 of the socket connector 4 to form an electrical connection. At this time, the resisting elastic pieces 323 are upwardly supported against the inner wall surface of the cover shell 142 of the casing 14, and the hook portions 321 of the two arms 32 are maintained in an upward elastic pre-forced state, and are stuck in the respective hook holes 42 to form positioning.

Please continue to refer to FIG. 5, which is a side cross-sectional view of the present invention, showing the hook portion of the buckle device hooked in the respective hook hole of the socket portion of the socket connector. It can be clearly seen from the drawings that when unlocking the present invention, pull the pull strap 23 at the opening 22 to squeezed and elastically deform the elastic portions 25 of the sliding seat 2 at the second mounting surface 113, so that the hook-shaped connecting portions 24 drive the hook-shaped linkage portions 322 of the buckle device 3 to act, such that the hook portions 321 of the two arms 32 are elastically deflected downward by a distance on both sides of the base block 11 through the rotating portions 33 as the axis, and the two hook portions 321 are separated from the respective hook holes 42 of the socket portion 41 of the socket connector 4 and descend into the respective through holes 1412 of the bottom shell 141. This method can make the connector 1 easily disconnected from the electrical connection of the socket connector 4.

Figure 3:
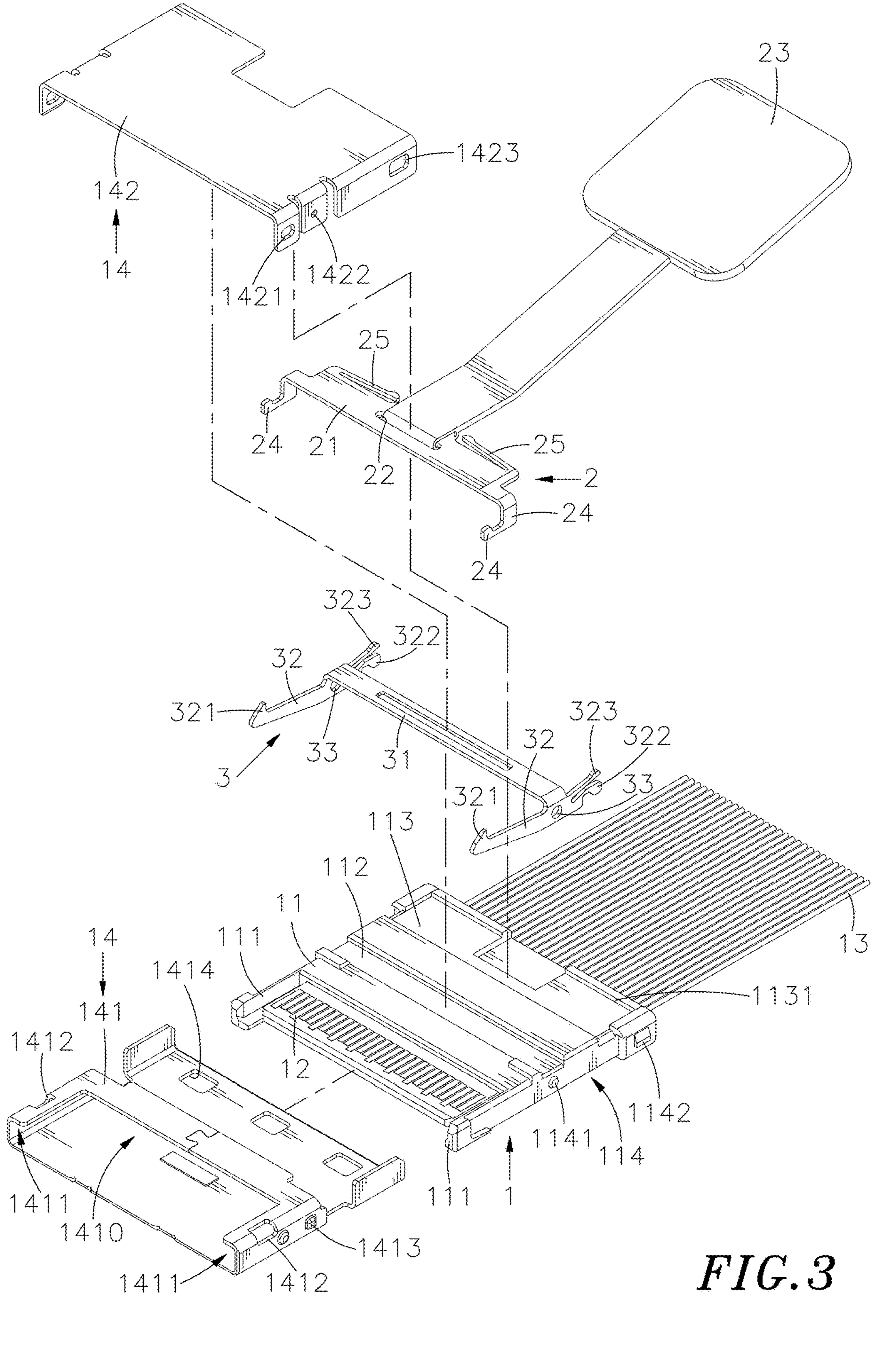
FIG. 3 is an exploded view of the present invention.
Figure 4:
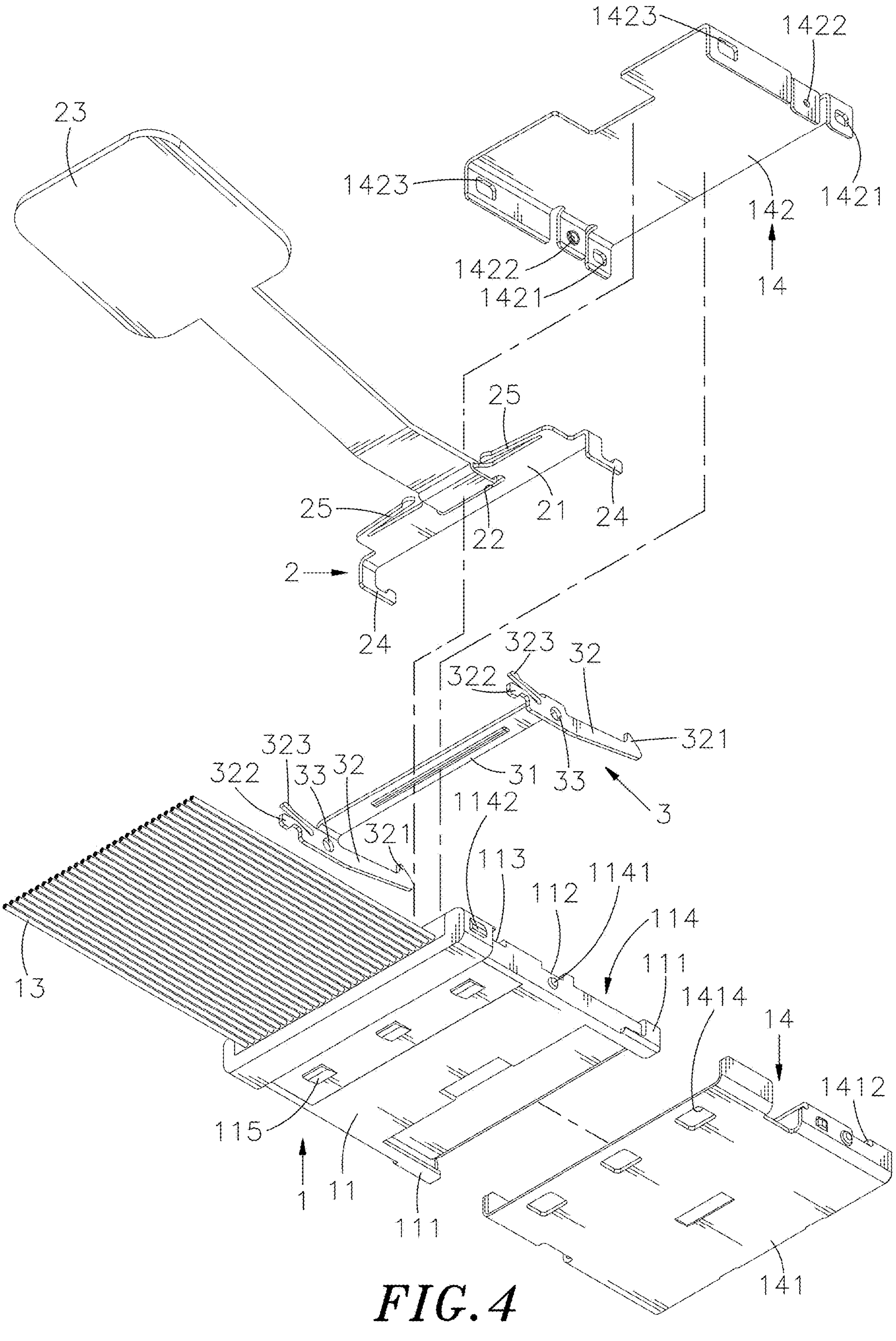
FIG. 4 is another perspective exploded view of the present invention.

Please continue to refer to FIGS. 3 to 5, which are exploded view of the present invention, another perspective exploded view of the present invention and side cross-sectional view of the present invention, showing the hook portion of the buckle device hooked in the respective hook hole of the socket portion of the socket connector. It can be clearly seen from the drawings that when the resisting elastic pieces 323 of the two arms 32 of the present invention are elastically supported upward against the inner wall surface of the cover shell 142 of the casing 14, the hook-shaped linkage portions 322 located below the two resisting elastic pieces 323 rotate downward, and the hook portions 321 on the front ends of the two arms 32 use the rotating portions 33 as the axis to apply the seesaw principle to generate a stable upward elastic pre-forced state. However, the two resisting elastic pieces 323 only need to have the hook portions 321 of the two arms 32 maintain upward elastic preload when the pull strap 23 is not pulled. However, the simple and equal changes and modifications of the positions of the two resisting elastic pieces 323 do not limit the scope of protection of the present invention, and are hereby stated.

In addition, in the embodiment of the present invention, the sliding seat 2 comprises two elastic portions 25 extending obliquely and bilaterally and integrally formed on the rear side of the seat body 21. However, the number of the elastic portions 25 can be at least one, and the sliding seat 2 can form a sliding state on the base block 11 through the elastically displaceable at least one elastic portion 25, and the obliquely extending configuration of the elastic portions 25 can also be changed to continuously bent configuration. Therefore, the elastic portions 25 only need to have elastic deformation and reset functions. Such simple equal changes and modifications do not limit the scope of protection of the present invention and are hereby stated.

In addition, in the embodiment of the present invention, the center of the docking portion 111 of the connector 1 is a circuit board-type mating terminal set 12, so that the mating terminal set 12 can be used as an electrical connection with the socket connector 4. Therefore, the mating terminal set 12 in the docking portion 111 of the connector 1 is not necessarily designed in in the form of a circuit board, but can also be used for other cable connectors with plural terminals or conductive sheets designed to be combined with cable plugs or sockets. Such simple equal changes and modifications do not limit the scope of protection of the present invention. Such simple equal changes and modifications should still be included in the patent scope covered by the present invention.

In addition, in the embodiment of the present invention, the rotating portions 33 of the buckle device 3 are combined with the pivot portions 1141 of the base block 11, and the cover shell 142 of the casing 14 is assembled on the base block 11, so that the limiting pivots 1422 of the cover shell 142 are assembled at the pivot portions 1141, and the buckle device 3 forms an axial limit and is in a swinging pivot state with the pivot portions 1141 as the axis. The buckle device 3 can also be assembled on the pivot portions 1141 of the base block 11 or on the limiting pivots 1422 of the cover shell 142 independently in a swinging state. Such simple equal changes and modifications do not limit the scope of protection of the present invention. Such simple equal changes and modifications should still be included in the patent scope covered by the present invention.

In addition, in the application of the present invention, when the present invention is unlocked multiple times, if the pull strap 23 is detached or broken at the joint, a flat preset hand tool or preset tool can be inserted into the opening 22 and then pushed backward to produce the same unlocking method as pulling the pull strap 23, so as to disconnect the connector 1 from the electrical connection of the socket connector 4.

In addition, the main feature of the present invention is that when the pull strap 23 is pulled, the resisting elastic pieces 323 can be elastically deformed to link the hook portions 321 of the two arms 32 to elastically deflect downward by a distance. This achieves the effect of the base block 11 of the connector 1 forming a stable connection with the corresponding socket connector 4 and ensuring the movement.

The above description is only the preferred embodiment of the present invention, and does not limit the patent scope of the present invention. Therefore, all simple modifications and equivalent structural changes made by using the description and drawings of the present invention shall be included in the patent scope of the present invention and shall be clearly stated.

To sum up, when the plug connector buckle release mechanism and its connector combination of the present invention are used, they can indeed achieve their effects and purposes. Therefore, the present invention is truly an invention with excellent practicality. In order to meet the application requirements for an invention patent, I filed the application in accordance with the law and hope that the review committee will approve the case as soon as possible to protect the inventor's hard work. If the review committee has any doubts, please feel free to send us a letter for instructions. The inventor will do our best to cooperate. We sincerely appreciate it.

What the invention claimed is:

1. A plug connector buckle release mechanism, comprising a connector, a sliding seat and a buckle device, wherein:

said connector comprises a base block, a mating terminal set mounted in said base block and a casing mounted outside said base block, said base block comprising a docking portion formed on a front side thereof and a first mounting surface and a second mounting surface formed on an upper surface thereof in sequence from said docking portion, said casing comprising two through holes bilaterally located on a top surface thereof corresponding to said docking portion;

said sliding seat comprises a seat body slidably mounted on said second mounting surface, a pull strap fastened to said seat body, two hook-shaped connecting portions respectively provided at two opposite lateral sides of said seat body, and at least one elastic portion formed on a rear side of said seat body for displacement elastically;

said buckle device is pivotally connected between said base block and said casing, said buckle device comprising a base portion placed on said first mounting surface and located on a front side of said seat body of said sliding seat and two arms respectively provided at two sides of said base portion and extending in the same direction toward said docking portion, each said arm comprising a hook portion protruding upward from a suspended front end thereof at a front side relative to said base portion, a hook-shaped linkage portion protruding downward from a suspended opposing rear end thereof at a rear side relative to said base portion and coupled to one respective said hook-shaped connecting portion of said sliding seat and a resisting elastic piece provided at the suspended rear end above said hook-shaped linkage portion and stopped against an inner wall surface of said casing; and wherein when pulling said pull strap, said sliding seat is pulled by said pull strap to elastically deform said at least one elastic portions, and also elastically deform said resisting elastic pieces of said two arms to link said hook portion of said two arms to elastically deflect downward at said through holes of said casing.

2. The plug connector buckle release mechanism as claimed in claim 1, wherein said base block further comprises two positioning structures respectively formed on two opposite lateral sides of said first mounting surface and said second mounting surface for the combination of said casing and the pivotal positioning of said buckle device, said resisting elastic piece provided at the suspended rear end above said hook-shaped linkage portion to elastically preforce said arm upward.

3. The plug connector buckle release mechanism as claimed in claim 2, wherein each said positioning structure of said base block comprises a pivot portion; said buckle device further comprises two rotating portions respectively located on said two arms adjacent to a base portion and respectively pivotally coupled to said pivot portions of said positioning structures of said base block.

4. The plug connector buckle release mechanism as claimed in claim 1, wherein said base block further comprises a stopper provided on said second mounting surface for stopping against said at least one elastic portion of said sliding seat.

5. The plug connector buckle release mechanism as claimed in claim 1, wherein said casing comprises a bottom shell set on said base block and a cover shell covering said first mounting surface and said second mounting surface, said cover shell comprising a limiting pivot provided on each of two side panels thereof corresponding to said first mounting surface.

6. The plug connector buckle release mechanism as claimed in claim 5, wherein said base block further comprises two limiting portions protruding outward on both sides of a rear periphery thereof and at least one engaging portion protruding from a bottom surface thereof; said bottom shell comprises two convex portions respectively located on two opposite lateral sides thereof, and at least one engaging hole located on a bottom surface thereof and respectively fastened to said at least one engaging portion of said base block; said cover shell comprises two through holes respectively provided on two side panels thereof and respectively fastened to said convex portion, said cover shell further comprises two limiting holes respectively provided on two side panels thereof remote from said through holes and respectively fastened to said limiting portions.

7. The plug connector buckle release mechanism as claimed in claim 1, wherein said hook-shaped connecting portions of said sliding seat are in the shape of an upper hook, and said hook-shaped linkage portions of said buckle device are in the shape of a downward hook.

8. The plug connector buckle release mechanism as claimed in claim 1, wherein said seat body of said sliding seat is provided with an opening for said pull strap to fasten.

9. The plug connector buckle release mechanism as claimed in claim 1, wherein each said elastic portion of said sliding seat is an obliquely extended elastomer.

10. A socket connector matching up with the plug connector buckle release mechanism as claimed in claim 1, said socket connector comprising a socket portion for said docking portion of said connector of said plug connector buckle release mechanism to be plugged into to form an electrical connection, and two hook holes respectively located on a top surface of said socket portion at two opposite sides for said hook portions of said arms to hook.

* * * * *